March 3, 1936.　　　　K. SANDER　　　　2,032,720
PIPE CONNECTION
Filed June 14, 1935
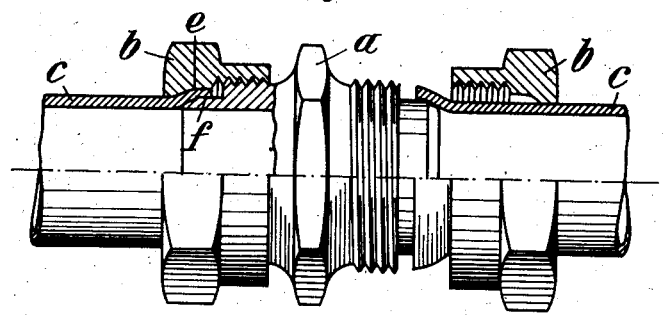
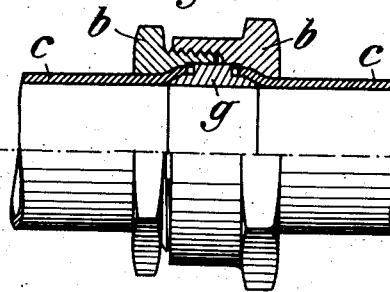
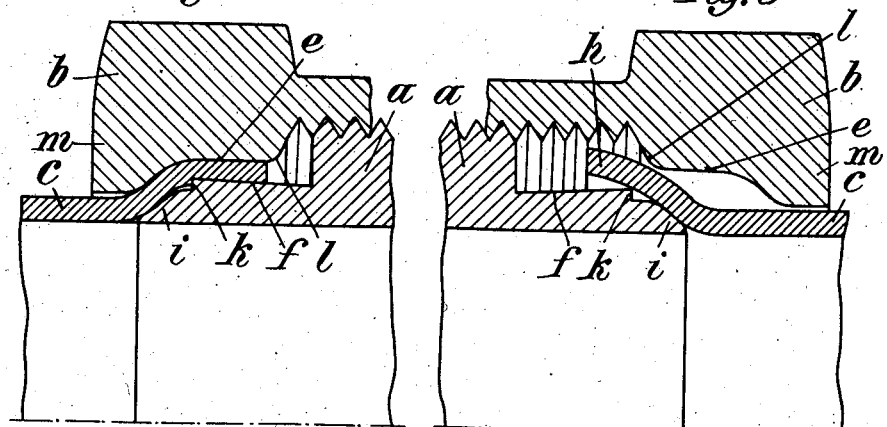
Inventor:
Karl Sander
By Sommers & Young
Attys Patented Mar. 3, 1936

2,032,720

UNITED STATES PATENT OFFICE 2,032,720

PIPE CONNECTION

Karl Sander, Onsabruck, Germany

Application June 14, 1935, Serial No. 26,669
In Germany June 16, 1934

3 Claims. (Cl. 285—86)

This invention relates to a pipe connection which is intended, in particular, for connecting and joining together those kinds of pipes which, owing to the thinness of their walls or to the lack of resistance of the material of which they are made, do not permit screw threads to be cut or formed in them, or in which the cutting or formation of screw threads is at least open to objection. It is known to connect together pipes of this kind by widening their ends in conical form and then clamping them between conical clamping members. These clamping members are generally made in the form of a nut and a threaded connecting piece. They may also comprise a double conical member which acts as an internal clamping piece.

The chief disadvantage of these known connections is that a perfectly tight joint can only be obtained when the pipes are absolutely central. With many forms of connection it is also necessary for the pipes to be cut off exactly at right angles to their axes if the tightness of the joint is not to be impaired. Now pipes which are exactly central are exceptional and it is not always possible, or it is at any rate a laborious and difficult operation, to cut off the ends of the pipes exactly at right angles to their axis. If now such a pipe is to be clamped between two cones and if, as is generally usual, there is arranged in the centre of the connection a double cone on to which a pipe is inserted from each side, then if the walls of the pipe are not of uniform thickness an absolutely tight joint between the cones and the pipe cannot be made. It is also not possible, when screwing the connection together, to compress the thicker parts of the pipe in such a way that a uniform thickness of wall is produced. Pipe connections of this kind, therefore, cannot be considered to be absolutely reliable. Further, when the ordinary known cone connections are employed, there is considerable danger from the grooves or unevennesses formed when the pipes are drawn which can never be entirely avoided during the manufacture, because, in the known cone connections, the material is only pressed against the packing cone without any actual displacement and deformation of material taking place and such drawing grooves remain substantially unchanged. At the most they are slightly compressed. They, therefore, always remain a danger and frequently result in lack of tightness occurring.

These disadvantages are also possessed by that form of pipe connection in which the ends of the pipe are pressed into a groove-like recess behind the conical surface in such a way that the pipe cannot be drawn out from the connection. In this form of connection also, surfaces of great conicity are employed for effecting the packing. It is true that the pipe can be well clamped between them but any eccentricity of the pipe and any grooves or the like which may be formed when the pipe is drawn cannot be prevented.

According to the present invention, these disadvantages are obviated by making the packing or contact surfaces of substantially cylindrical form and so that they enclose an annular space, the internal width of which is less than the thickness of the wall of the pipe. The end of the pipe is then forced into this annular space, being plastically deformed at the same time. In order that the pipe may be plastically deformed when the connection is tightened up, the forward end of the inner packing or contact surface is reduced so as to present a sharp edge. The result of this is that, when the nut is tightened up, this edge presses to some extent into the inner surface of the wall of the pipe. By these means there is obtained on the one hand a preliminary tightening, and further the pipe is held fast on the inside so that when the connection is further tightened the pipe is drawn forwards and is pressed against the packing or contact surface, while at the same time the thickness of the wall of the pipe is reduced. By this means any nonuniformity or unevenness due to eccentricity or grooves formed when the pipe is drawn is equalized. The external packing or contact surface makes a gradual transition into the front face of the outer clamping member in order to reduce the friction between the outer wall of the pipe and the inner wall of the outer clamping member.

Preferably, the inner clamping member is provided in addition with a projecting nose and the outer member with a second shoulder. When the connection has been completely tightened, the pipe is clamped between the said shoulder and nose at a place where the thickness of its wall has not yet been reduced. By these means the actual packing or clamping surface is relieved from any tensile stress in the direction of the axis of the pipe. The danger of the pipe breaking is avoided because at the beginning of the widened part of the pipe the full thickness of their wall is still maintained and not reduced.

The strength of the connection can be still further improved by making the inner packing or contact surface of such a form that the annular space widens in the direction of movement of the nut when it is being tightened. The packing surface can, however, also be of slightly conical shape in the same sense as the cone of the pipe. The cone, however, may not be of such conicity that it prevents the end of the pipe from being drawn thinner between the packing surfaces.

Various constructional embodiments of the new pipe connection are illustrated by way of example in the accompanying drawing, in which:—

Figure 1 shows a pipe connection comprising a nipple on which nuts are screwed from both sides;

Figure 2 shows a pipe connection having an inner clamping member without a screw thread; and Figures 3 and 4 illustrate on a greater scale a section of the pipe connection, Figure 3 showing the connection before being tightened and Figure 4 the completely tightened connection.

Referring to Figure 1 of the drawing the connection shown in this figure consists of a central nipple $a$ on which the nuts $b$ are screwed from both sides. In this form of connection, the ends $c$ of the pipes are clamped between the surfaces $e$ and $f$. In the form of construction shown in Figure 2 an inner clamping member $g$ is used in place of the nipple $a$.

As may be seen from the Figures 3 and 4, the inner contact surface $f$ is reduced in front at $k$ so as to present a sharp edge, while the front face of the outer clamping member, namely the nut $b$, makes a gradual transition at the place $l$ into the outer contact surface $e$. This contact surface $e$ is narrowed down at $m$ to form a shoulder which corresponds to the nose $i$ on the inner member or nipple. The contact surface $f$ of the inner member or nipple is of conical form.

When the nut $b$ is tightened the conical end $h$ of the pipe first abuts against the nose $i$. Then the rounded edge $l$ of the nut comes into action, and at first it presses the pipe against the sharp edge $k$ which penetrates slightly into the tube. On tightening the nut further the edge $l$ of the nut draws the pipe $h$ over the edge $k$ and presses it against the contact surface $s$ while simultaneously reducing the thickness of its wall, while at the same time the outer wall of the pipe comes to abut against the contact surface $e$. The connection is tightened up until the shoulder $m$ presses the pipe against the nose $i$.

In the position illustrated in Figure 4 the actual tight joint occurs between the surfaces $e$ and $f$. The edge $k$ which has been slightly pressed into the tube acts as an additional packing or tightening means. Finally, the pipe is clamped between the shoulder $m$ and the nose $i$ in such a way that it is protected from axial tensile stresses.

What I claim is:—

1. A pipe connection of the kind in which the conically widened ends of the pipe are clamped between clamping members, which are preferably in the form of a nut and an internal nipple, characterized by the feature that the contact surfaces are of substantially cylindrical form and the internal width of the annular space between them is less than the thickness of the wall of the pipe and the inner contact surface is reduced in front so as to form a sharp edge, while the front face of the outer member or nut makes a gradual transition into its contact surface, so that when the connection is tightened up the end of the pipe is drawn into the annular space and is held fast on the inside at the said sharp edge.

2. A pipe connection in accordance with claim 1, in which the inner clamping member is provided with a projecting nose and the external clamping member with a shoulder and the pipe is clamped between the said nose and shoulder at a place where the thickness of its wall has not yet been reduced, for the purpose of taking up tensile stresses.

3. A pipe connection in accordance with claim 1, in which the inner packing or contact surface is so formed that the annular space widens in the direction of movement of the nut when being tightened up.

KARL SANDER.